Sept. 30, 1958 J. C. WINSLOW 2,853,723
RIVET REMOVING TOOL WITH CUTTING EDGES AND IMPACT SURFACE
Filed Aug. 24, 1953
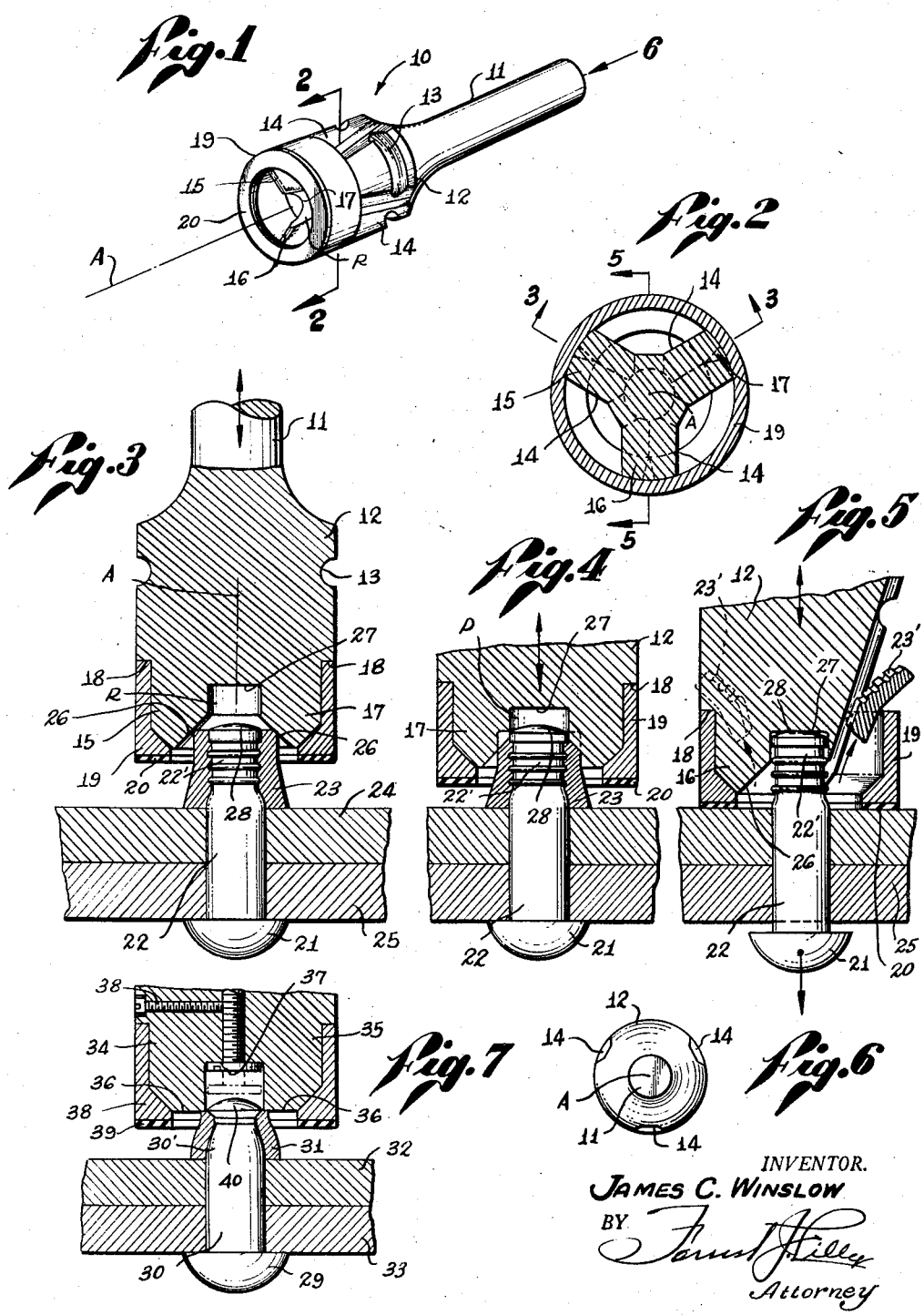
INVENTOR.
JAMES C. WINSLOW
BY
Attorney

United States Patent Office 2,853,723
Patented Sept. 30, 1958

2,853,723

RIVET REMOVING TOOL WITH CUTTING EDGES AND IMPACT SURFACE

James C. Winslow, Sierra Madre, Calif., assignor to Winslow Product Engineering Corporation, Los Angeles, Calif., a corporation of California Application August 24, 1953, Serial No. 375,946

10 Claims. (Cl. 7—14.1)

This invention relates to a tool for removing rivets and is particularly directed to a tool for removing rivets having collars about their exposed shank portions such as the "High Shear" and "Huck" type rivets, for example, employed in aircraft construction.

In disassembling riveted structures, it is highly desirable to remove the rivets with as little damage as possible to the work pieces. Heretofore, this operation has always been extremely time consuming particularly when careful attention is paid to the preserving of the work. One known method, for example, simply employs a chisel and hammer. With these tools, blows on the rivet collar are necessarily applied to one side of the collar at a time resulting in possible deformation of the rivet hole and damage to the work piece. Another tool, known as a hollow end mill, is power driven by an auxiliary source and is designed to mill away the collar in a manner overcoming the above-noted disadvantage of unequal forces applied thereto. This operation still requires considerable time however and there is still present the possibility of damaging the work piece.

It is accordingly a primary object of the present invention to provide a novel method and tool for removing rivets, operating on different principles from those heretofore employed. The tool for effecting this method is not only extremely simple, rugged, and economical to manufacture, but is adapted to be powered by a conventional rivet gun.

Another object is to provide in such a tool positive means for preventing any damage to the work pieces held together by the rivet.

A further object of the invention is to provide a method and tool for removing rivets in which such operations may be effected in an extremely short period of time— for example, in the neighborhood of one or two seconds, thereby greatly facilitating the rapid disassembly of riveted structures.

These and further objects and advantages of the invention are attained by providing a tool designed to cut grooves in the rivet collar at uniformly spaced circumferential points whereby the collar is structurally weakened. The tool then applies one or more blows to the end shank portion of the rivet, transmitting pressure waves laterally to the collar to shatter the same. With the collar removed, continued application of the blows will dislodge the rivet with a minimum of damage to the work pieces.

The tool itself comprises a generally cylindrical member having channels laterally cut therein to define tapered chisels, the cutting edges of the chisels lying in radially extending planes with respect to a central axis of the member. The tapered chisels are uniformly spaced circumferentially about the member axis and define a central recess of given depth. The depth of this recess is purposely made less than the length of the shank portion of the rivet protruding above the work piece and about which the collar is placed, whereby the end of the rivet shank will receive a blow before the chisel edges cut completely through the collar and engage the work piece. A cylindrical cap is provided with a resilient base such as rubber for example to engage the work piece after the chisel cutting edges have cut suitable weakening grooves in peripheral portions of the collar a given distance, thereby preventing the chisel edges from contacting the work.

With the above described arrangement, it will be seen that the rivet collar will be weakened by grooves cut therein when the chisel edges are applied to the collar and the rivet gun operated. This will result in complete shattering of the collar when the bottom of the recess strikes the end of the rivet shank. This shattering is effected by lateral pressure waves through the shank portion resulting from the one or more blows by the bottom of the recess on the shank end.

A better understanding of the present method and tool will be had by referring to the accompanying drawings, in which:

Fig. 1 is a perspective view of a preferred embodiment of the tool;

Fig. 2 is a cross-section of the tool taken in the direction of the arrows 2—2 of Fig. 1;

Fig. 3 shows an elevational cross-section of the tool as initially applied to a "Huck" type rivet and collar, taken along the line 3—3 of Fig. 2;

Fig. 4 is a view similar to Fig. 3 showing the position of the tool after weakening grooves have been partially cut in the rivet collar;

Fig. 5 is another elevational view as taken along the line 5—5 of Fig. 2 showing the final stage of removing the rivet collar;

Fig. 6 is an end view of the tool as seen in the direction of the arrow 6 of Fig. 1; and Fig. 7 is an elevational view similar to Fig. 3 of a tool adapted for removing "High Shear" type rivets.

Referring to Fig. 1, the tool is designated generally by the numeral 10 and comprises a reduced diameter stem portion 11 integrally formed with an enlarged cylindrical member or portion 12. The cylindrical member 12 is provided with an annular groove 13 adjacent the stem 11, this stem being adapted to fit in a conventional rivet gun and the groove 13 serving to nestle the retaining spring on the gun. The cylindrical member 12 is also provided with circumferentially spaced cut-out portions defining longitudinally extending channels 14 increasing in width and depth as they approach the operating end of the member. The walls of these channels define tapered portions forming chisels 15, 16, and 17 uniformly circumferentially spaced with respect to a central axis A of the cylindrical member 12. It will be noted that the cutting edges of the chisels 15, 16, and 17 lie in radially directed planes with respect to the central axis and are spaced from the axis to define a central recess R. While two chisels could be used, preferably, at least three chisels are provided.

In Fig. 2, the circumferential disposition of the three chisel portions 15, 16, and 17 and cut-out channels 14 with respect to the central axis A is clearly shown. Fig. 6 shows an end view as seen looking in the direction of the arrow 6 in Fig. 1.

Referring now to Fig. 3 it will be noted that the tapered portions forming the chisels are provided with shoulders 18 approximately midway of the member 12 against which one end of a cylindrical cap 19 abuts. The other end of cap 19 extends beyond the end of the chisel cutting edges and is provided with an annular cushioning or resilient material to provide a base 20.

To illustrate the purpose for the cap 19 and the operation of the remaining structure of the tool in removing a rivet, there is shown in Fig. 3 a typical "Huck" type rivet comprising a rivet head 21 and a rivet shank 22 having a protruding shank portion 22' surrounded by the usual rivet collar 23 for holding together two work pieces 24 and 25. As shown in Fig. 3, the chisel cutting edges 26 are angularly oriented with respect to the collar axis to permit the tool to be centered over different diameter collars. This centering action is readily effected in view of the uniform circumferential spacing of the three chisel cutting edges providing three points of engagement with the rivet collar. The recess R is designed to have a given depth such that the bottom 27 of the recess will engage the end 28 of the protruding shank portion 22' of the rivet before the cutting chisel edges 26 reach the work piece 24. In other words, the distance between the lowermost point of the cutting edges 26 and the bottom of the recess R at 27 is less than the length of the protruding shank portion 22' of the rivet. The diameter of the recess R is made at least as great as the diameter of the protruding shank portion 22' whereby this shank portion may fit within the recess.

The operation of the tool will be clear from the above description. Referring to Figs. 3, 4, and 5, to remove the rivet from the work pieces 24 and 25, the chisel cutting edges 26 are centered over the collar after the tool has been inserted into the usual type rivet gun. When the rivet gun is operated the stem portion 11 and tool 12 are rapidly reciprocated in the direction of the axis A as indicated by the arrows. This reciprocatory motion works the chisel cutting edges 26 into the collar 23 as shown in Fig. 4 thereby cutting circumferentially spaced grooves about the collar 23. These grooves structurally weaken the collar.

After a few blows, the cutting edges of the chisels have cut down a sufficient distance along the lateral edges of the collar to a point where the bottom of the recess R, indicated at 27, engages the shank end 28 of the rivet. At this point, severe blows on the end shank portion 28 by the tool will transmit pressure waves through the shank of the rivet in all directions, the lateral pressure waves serving to shatter the weakened collar 23 into pieces 23' as clearly shown in Fig. 5. These last few blows will also dislodge the rivet from the work piece as indicated by the spacing between the head 21 and work piece 25 in Fig. 5. However, the downward movement of the chisel cutting edges is limited by the cylindrical cap 19, the cushioning base 20 of which eventually engages the upper work piece 24 thus preventing the chisel cutting edges from damaging the work piece. After this operation, the rivet is easily removed from its hole.

The cylindrical cap 19 about the chisels 14, 15, and 16 of the tool is preferably removable for facilitating replacing the rubber base if such appears to be necessary.

Fig. 7 shows a slightly modified type of tool useful for removing "High Shear" type rivets. In this figure, a "High Shear" rivet is shown as comprising a head 29, shank portion 30, and protruding shank portion 30' about which a suitable collar 31 is affixed, for holding together work pieces 34 and 35.

In the tool shown in Fig. 7, the cutting edges 36 of the chisels are substantially coplanar and horizontal. The depth of the recess R is made variable by an adjusting screw, having an enlarged head 27, threaded into a bore in the bottom of the recess. A set screw 38 may be provided to lock the screw head 37 in any set position. The depth of the recess will thus be defined by the distance between the cutting edges 36 and the surface of the head 37 of the adjusting screw in the recess. As in the embodiment of Figs. 3 to 5, this distance is made less than the length of the shank portion 30' of the rivet protruding above the work piece 32, so that the head 37 in the recess will engage the rivet shank end 40 before the cutting edges 36 reach the work piece 32. As also in the case of the tool of Figs. 3 to 5, there is provided a protecting cylindrical end cap 38 extending beyond the chisel edges and provided with an annular resilient base 39, to insure that these edges will not cut into the work piece 32 after the rivet shank has been driven partially out of the rivet hole. The operation of the tool shown in Fig. 7 is identical in principle to that shown in Figs. 3 to 5.

It is to be emphasized in accordance with the present invention that the tool is designed for effecting the following method of removing the rivet: first the rivet collar is weakened by longitudinal cuts at spaced points about its periphery. Then the collar is completely shattered due to lateral pressure waves transmitted from the rivet shank portion enclosed by the collar due to blows applied to the end of the shank portion by the bottom of the recess of the tool. It will therefore be apparent that various modifications in the actual tool construction may be effected without departing from the scope of the invention. For example, a rubber type washer as a separate part to replace the cushioning base may be placed about the rivet before applying the tool.

The principal advantage of the tool is its relative simplicity and adaptability to a conventional type rivet gun. Particularly important, is the rapidity with which rivets may be removed. In actual practice, the operation of shattering the rivet collar and removing the rivet usually takes no more than one or two seconds.

I claim:

1. A rivet removing tool comprising: chisels having cutting edges uniformly spaced about a central axis, said edges lying in radially directed planes with respect to said axis and having their radially inner ends radially spaced from a center point, and a transverse impact surface axially alined with the spacing between said inner ends for engagement with the end of a rivet being removed.

2. A rivet removing tool comprising: a body formed at one end with rigid chisels having cutting edges uniformly spaced about a central axis, said edges lying in radially directed planes with respect to said axis and diverging in the direction of said end, the radially inner ends of said edges being radially spaced from a center point to define a central recess having a base at a given depth, said base forming an impact surface for engagement with the end of a rivet being removed.

3. A tool for removing a rivet having a collar about the shank portion of the rivet protruding through a work, said tool comprising: an integral member having portions forming chisels, the cutting edges of the chisels being uniformly spaced from a central axis, said chisels defining a recess coaxial with the central axis and having a base at a given depth, the diameter of said recess being at least equal to the diameter of the collar receiving shank portion of the rivet, and the depth of said recess being less than the length of that portion of the collar receiving shank of the rivet protruding above the work.

4. A tool according to claim 3, in which a cylindrical cap surrounds said chisels and extends beyond the chisel cutting edges, thereby preventing said cutting edges from engaging said work.

5. In a tool for removing a rivet having a portion of its shank protruding through a work piece and a rivet collar about said portion: an elongated cylindrical member having longitudinal portions defining chisels uniformly spaced circumferentially about the central axis of said member, said chisels defining a recess coaxial with said central axis and having a diameter at least as great as the diameter of the protruding portion of the rivet shank, said recess having a base at a depth less than the protruding portion of the rivet shank, whereby the end of the protruding shank portion will engage the bottom of the recess before the cutting edges of the chisels engage the work piece.

6. A rivet removing tool comprising: an enlarged cylindrical member having laterally cut channels with uniformly increasing depth and width as they approach the end of the cylindrical member, whereby the remaining portions of the cylindrical member define chisels uniformly spaced about a central axis of the member, the chisel cutting edges lying in radially directed planes with respect to said axis, said chisels and member defining a central recess having a base of given depth; the outer side of each chisel having a shoulder portion a given distance from the cutting edges; and an end cap of cylindrical shape surrounding the chisels and having a length greater than said given depth, one end of the cap engaging the shoulder portions and the other end extending beyond the chisel cutting edges.

7. A tool according to claim 6, including an annular resilient base secured to said other end of the cylindrical cap.

8. A tool according to claim 6, including means for adjusting said given depth comprising a screw threadedly secured to the base of the recess and having an enlarged head adapted to move axially of the recess upon rotation of said screw.

9. A rivet removing tool comprising: chisels having cutting edges uniformly spaced about a central axis, said edges lying in radially directed planes with respect to said axis and being radially spaced from a central point to define a central recess, means defining a transverse impact surface at a given depth in said recess for engagement with the end of a rivet being removed, and means adjustably mounting said last mentioned means on the tool for adjustment of said depth.

10. A rivet removing tool comprising a body portion having an axial recess terminating in a transverse bottom surface, a plurality of chisels within said body portion and uniformly spaced apart around said recess, each chisel having a cutting edge on its free end thereof, and said cutting edges lying in radially directed planes extending outwardly from said recess.

References Cited in the file of this patent

UNITED STATES PATENTS

| | | |
|---|---|---|
| 1,093,252 | Carves | Apr. 14, 1914 |
| 1,568,372 | Flanagan | Jan. 5, 1926 |
| 1,658,418 | Rinallo | Feb. 7, 1928 |
| 2,204,516 | Stone | June 11, 1940 |
| 2,391,405 | Fuglie | Dec. 25, 1945 |
| 2,410,464 | Scott | Nov. 5, 1946 |
| 2,443,215 | Wilk | June 15, 1948 |